United States Patent
Shah et al.

(10) Patent No.: US 7,260,644 B1
(45) Date of Patent: Aug. 21, 2007

(54) APPARATUS AND METHOD FOR RE-DIRECTING A CLIENT SESSION

(75) Inventors: Gaurang K. Shah, Cary, NC (US);
Chris O'Rourke, Apex, NC (US);
Pranav K. Tiwari, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1059 days.

(21) Appl. No.: 09/965,592

(22) Filed: Sep. 26, 2001

(51) Int. Cl.
*G06F 15/173* (2006.01)

(52) U.S. Cl. .................. 709/238; 709/217; 709/224; 709/227; 718/105

(58) Field of Classification Search ............... 709/217, 709/219, 223–226, 229, 203, 238, 227; 718/105
See application file for complete search history.

(56) References Cited

U.S. PATENT DOCUMENTS

| | | | |
|---|---|---|---|
| 5,495,426 A | 2/1996 | Waclawsky et al. | |
| 5,774,660 A * | 6/1998 | Brendel et al. | 718/105 |
| 5,983,281 A * | 11/1999 | Ogle et al. | 709/239 |
| 6,173,322 B1 * | 1/2001 | Hu | 709/224 |
| 6,249,801 B1 * | 6/2001 | Zisapel et al. | 718/105 |
| 6,314,465 B1 | 11/2001 | Paul et al. | |
| 6,332,157 B1 * | 12/2001 | Mighdoll et al. | 718/105 |
| 6,351,775 B1 * | 2/2002 | Yu | 709/238 |
| 6,360,262 B1 * | 3/2002 | Guenthner et al. | 709/224 |
| 6,360,270 B1 * | 3/2002 | Cherkasova et al. | 709/229 |
| 6,373,585 B1 | 4/2002 | Mastie et al. | |
| 6,374,297 B1 | 4/2002 | Wolf et al. | |
| 6,374,300 B2 * | 4/2002 | Masters | 718/105 |
| 6,404,766 B1 * | 6/2002 | Kitai et al. | 370/392 |
| 6,411,086 B1 | 6/2002 | Choi et al. | |
| 6,415,323 B1 | 7/2002 | McCanne et al. | |
| 6,449,647 B1 | 9/2002 | Colby et al. | |
| 6,473,802 B2 | 10/2002 | Masters | |
| 6,608,830 B1 * | 8/2003 | Hirano et al. | 370/351 |
| 6,754,706 B1 * | 6/2004 | Swildens et al. | 709/227 |
| 6,772,333 B1 * | 8/2004 | Brendel | 718/105 |
| 6,775,687 B1 * | 8/2004 | Binding et al. | 709/224 |
| 6,779,017 B1 * | 8/2004 | Lamberton et al. | 709/238 |
| 7,197,547 B1 * | 3/2007 | Miller et al. | 718/105 |
| 2003/0014480 A1 * | 1/2003 | Pullara et al. | 709/203 |
| 2003/0014526 A1 * | 1/2003 | Pullara et al. | 709/227 |

OTHER PUBLICATIONS

Yeom et. al., IP Multiplexing by Transparent Port-Address Translator, Oct. 1996, USENIX, 1996 LISA X, pp. 113-122.*

* cited by examiner

*Primary Examiner*—Ario Etienne
*Assistant Examiner*—Ramy M Osman
(74) *Attorney, Agent, or Firm*—Baker Botts L.L.P.

(57) ABSTRACT

A load balancer in a wireless access protocol network receives a request from a client terminal. The load balancer selects one of a plurality of gateways to process the request. The load balancer sends a re-direct message to the client terminal that includes information identifying the selected gateway. The client terminal then sends out a subsequent request that includes the information identifying the selected gateway. The subsequent request is transferred to the selected gateway for processing without further intervention by the load balancer.

20 Claims, 2 Drawing Sheets

APPARATUS AND METHOD FOR RE-DIRECTING A CLIENT SESSION

TECHNICAL FIELD OF THE INVENTION

The present invention relates in general to information transfer and processing and more particularly to an apparatus and method for re-directing a client session.

BACKGROUND OF THE INVENTION

A Wireless Access Protocol (WAP) load balancer is a device that distributes WAP traffic received over a wireless network on a User Datagram Protocol (UDP) bearer network among a group of WAP gateways. Each WAP gateway translates requests from the WML stack to a WWW protocol stack, such as HTML and TCP/IP. The WAP gateway encodes and decodes web content to reduce the size and number of packets traveling over the wireless network. The WAP gateway interfaces with subscriber databases in order to provide client specific services.

Because of the growth and size of the wireless subscriber market, content customers providing WAP services are quickly experiencing more bottlenecks at their WAP gateways. The WAP load balancer is used to distribute WAP traffic among WAP gateways in order to relieve and avoid bottlenecks in the system.

A Wireless Session Protocol (WSP) is a session layer protocol for operation between a WAP client and a WAP gateway. The WSP provides connection oriented and connection-less oriented session services with optional security to upper level application layers. For a connection oriented service, the client establishes a reliable session with a server and releases that session in an orderly manner. The association between client and server session is with a session identifier. The WAP gateway maintains the session state based on the session identifier for all session management packets.

With multiple WAP gateways, the WAP load balancer must ensure that all packets associated with a single session are sent to the same WAP gateway. This becomes problematic when a gateway re-directs a request to a different port and/or Internet Protocol address in order to obtain the necessary information to satisfy the request. Therefore, it is desirable to be able to re-direct a request in a multiple gateway environment.

SUMMARY OF THE INVENTION

From the foregoing, it may be appreciated by those skilled in the art that a need has arisen for a technique to handle request re-direction in a multiple gateway environment. In accordance with the present invention, an apparatus and method for re-directing a client session are provided that substantially eliminate or greatly reduce disadvantages and problems associated with convention session re-direction techniques.

According to an embodiment of the present invention, there is provided a method for re-directing a client session that includes receiving a session initiation request from a client terminal. One of a plurality of gateways is selected to process the request. A re-direct message is sent to the client terminal that includes information identifying the selected gateway. Subsequent requests may then be transferred from the client terminal to the selected gateway without additional processing. The information identifying the selected gateway may be a private port number associated with the selected gateway or the Internet protocol address of the selected gateway.

The present invention provides various technical advantages over conventional WAP Gateway deployment. For example, one technical advantage is to provide seamless WAP Gateway scalability by re-directing a client's session from a load balancer using either a destination port number or an Internet Protocol address. Another technical advantage is to direct client traffic to a previously chosen gateway for all requests in a session regardless of whether the session is suspended and subsequently resumed. Yet another technical advantage is to avoid depending on the session identifier for traffic routing during re-direction. Other technical advantages may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
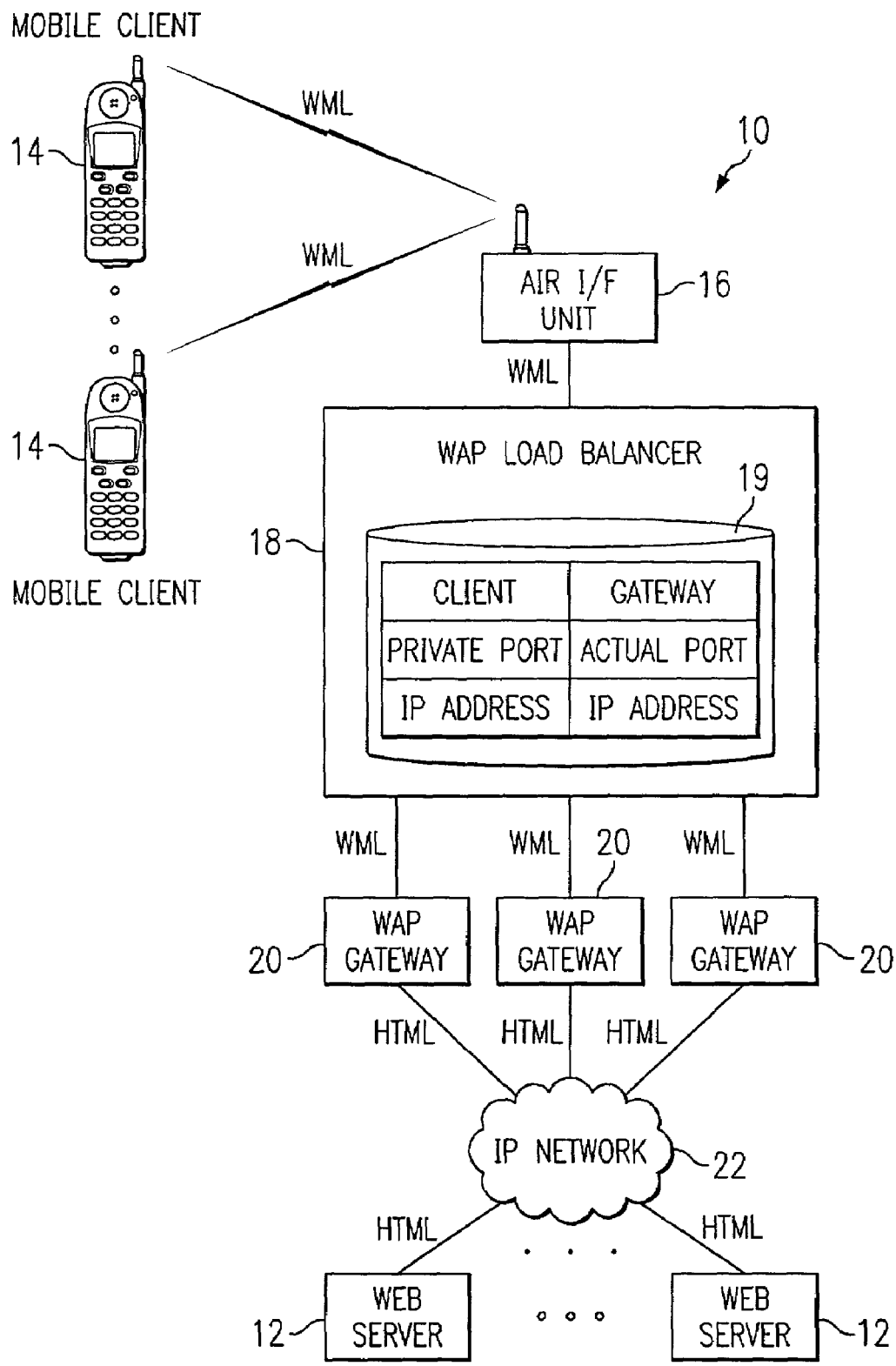
FIG. 1 illustrates a block diagram of a wireless access protocol network.

FIG. 1 is a block diagram of a wireless access protocol (WAP) network 10. WAP network 10 provides access to and from a web server 12 for a mobile WAP client 14. WAP network 10 includes an air interface unit 16 to receive and transmit WAP traffic in a Wireless Markup Language (WML) from and to WAP client 14. WAP traffic received from WAP client 14 by air interface unit 16 is provided to a WAP load balancer 18. WAP load balancer 18 assigns the WAP traffic to one of a plurality of WAP gateways 20 using a processor 19. WAP load balancer 18 may be between air interface unit 16 and WAP gateways 20 as shown or may be part of a network link to air interface unit 16 with WAP gateways 20. Each WAP gateway 20 converts the WAP traffic from the WML format to a Hyper Text Markup Language (HTML) format. The WAP traffic in the HTML format is passed onto web server 12 through an Internet Protocol (IP) network 22.

Web server 12 generates a response in the HTML associated with the received WAP traffic request. The response is sent to the appropriate WAP gateway 20 through IP network 22. WAP gateway converts the response from the HTML format to the WML format. WAP gateway passes the response in the WML format to WAP load balancer 18 for transmission to WAP client 14 through air interface 16.

Communications between WAP gateway 20 and WAP mobile client 14 operate according to a session layer protocol such as a Wireless Session Protocol (WSP). WSP allows for sessions to be suspended and resumed. If a session is suspended, WAP load balancer 18 will need to know which WAP gateway 20 to which WAP mobile client 14 was communicating in order to provide a seamless and transparent operation upon the resumption of the session.

Figure 2:
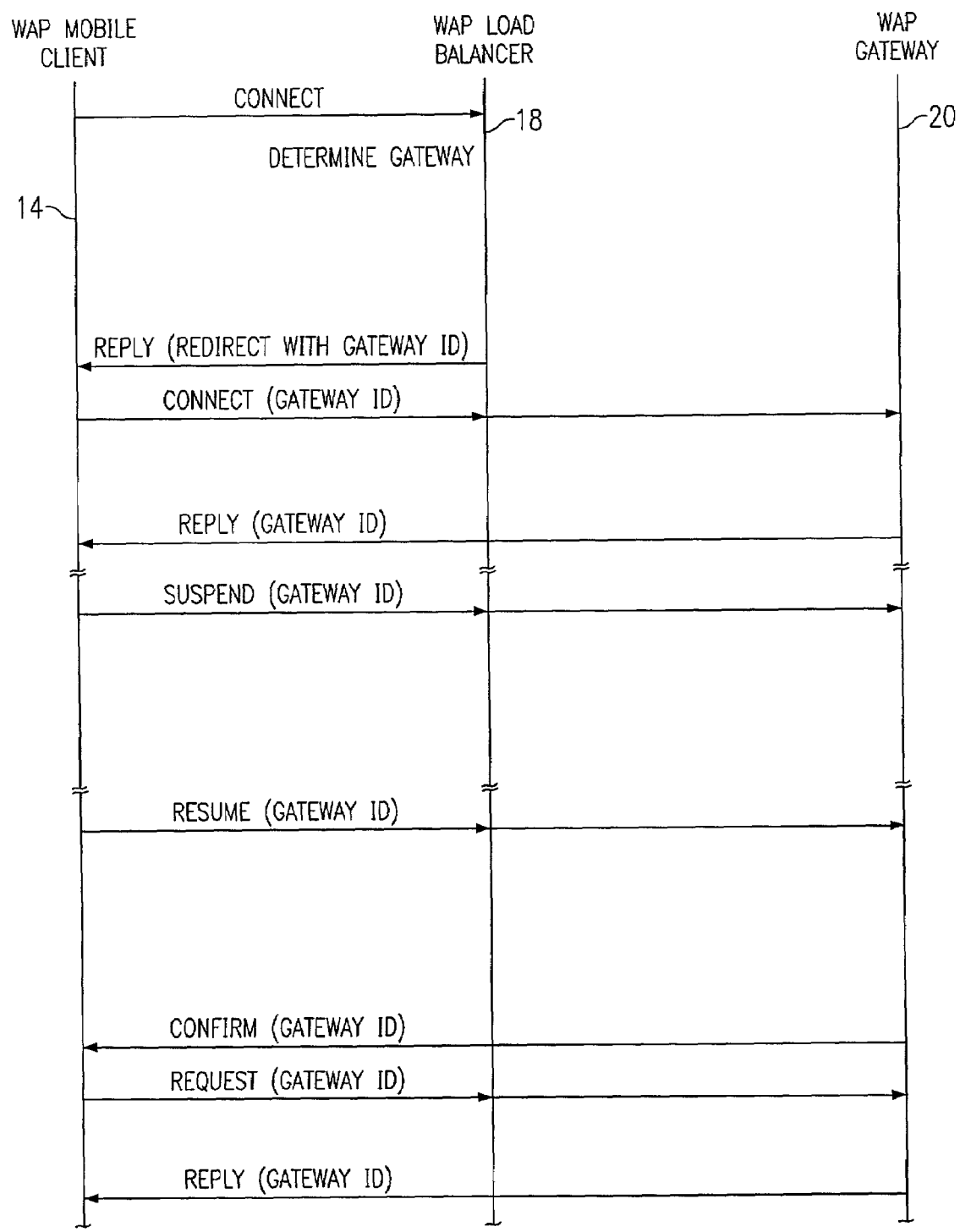
FIG. 2 illustrates operation of the wireless access protocol network.

FIG. 2 shows an example of a session between WAP mobile client 14 and WAP gateway 20 through WAP load balancer 18. WAP mobile client 14 initiates a session by sending a CONNECT message in order to establish communications with a WAP gateway 20. WAP load balancer 18 receives the CONNECT message and determines which one of the WAP gateways 20 is to interact with this WAP mobile client 14. This determination may be accomplished through any of a variety of techniques, including sophisticated priority schemes and assignments or simple cyclical round robin fashion. Once determined, WAP load balancer 18 generates a REPLY message to WAP mobile client 14 that includes a re-direct message. The re-direct message includes information identifying the WAP gateway 20 selected for processing requests from WAP mobile client 14. WAP mobile client 14 then sends a subsequent CONNECT message containing the information identifying the selected WAP gateway 20 which is transferred to the selected WAP gateway 20 either directly or transparently through WAP load balancer 18 depending on the configuration with air interface unit 16. WAP mobile client 14 establishes a session with the selected WAP gateway 20 through REQUEST and REPLY messages and continues with the session until suspension or termination of the session. Upon suspension of a session, WAP mobile client 14 may resume the session in an efficient manner as it knows the information identifying the selected WAP gateway 20.

Information identifying the selected gateway may be provided in at least two methods. In one method, WAP load balancer 18 provides a port number associated with the selected WAP gateway 20 to WAP mobile client 14 in the re-direct message of the REPLY message. Each WAP gateway is assigned a private port number in WAP load balancer 18. Upon receiving a request from WAP mobile client 14, WAP load balancer selects a WAP gateway 18 and provides its private port number to WAP mobile client 14. WAP mobile client 14 communicates with the selected WAP gateway 20 through this private port number. WAP load balancer 18 maintains an association between WAP mobile client 14 and the selected WAP gateway 20 in processor 19.

Under the Wireless Session Protocol, there may be a defined destination port number such as 9201. WAP load balancer 18 may translate between the private port number provided to WAP mobile client 14 and the defined 9201 destination port number. When receiving a subsequent request from WAP mobile client 14 that includes a private port number, WAP load balancer 18 translates the private port number into the defined 9201 destination port number of the selected WAP gateway 20. Similarly, when receiving a response from the selected WAP gateway 20 having the defined 9201 port number, WAP load balancer 18 translates the defined 9201 port number to the private port number associated with the selected WAP gateway 20.

In a second method, the information identifying the selected WAP gateway 20 is the IP address of the selected WAP gateway 20. Upon receiving the request from WAP mobile client 14, WAP load balancer 18 selects an appropriate WAP gateway to process the request. WAP load balancer 18 then sends a re-direct message to WAP mobile client 14 that includes the IP address of the selected WAP gateway 20. WAP mobile client 14 can send subsequent requests to the selected WAP gateway 20 using the provided IP address without further intervention by WAP load balancer 18. WAP load balancer 18 maintains the relationship between WAP mobile client 14 and the selected WAP gateway 20 as this re-direction technique may be of a temporary or permanent nature.

With the re-direction approaches discussed above, WAP load balancer 18 has one to one relationship information between WAP mobile clients 14 and WAP gateways 20. With this information, WAP load balancer 18 can direct client traffic to a previously chosen gateways without monitoring session state, without having to process session identifiers, and with the flexibility to handle suspend and resume scenarios.

Thus, it is apparent that there has been provided, in accordance with the present invention, an apparatus and method for re-directing a client session that satisfies the advantages set forth above. Although the present invention has been described in detail, it should be understood that various changes, substitutions, and alterations may be made herein. For example, though discussed with reference to a wireless network, the present invention may be equally incorporated in wireline or optical networks. Other examples may be readily ascertainable by those skilled in the art and may be made herein without departing from the spirit and scope of the present invention as defined by the following claims.

What is claimed is:

1. A method for re-directing a client session, comprising:
  receiving a request from a client terminal at a load balancer;
  selecting one of a plurality of gateways being managed by the load balancer to process the request;
  sending a re-direct message to the client terminal from the load balancer, the re-direct message including information identifying the selected gateway;
  receiving at the load balancer from the client terminal a subsequent request associated with the re-direct message, the subsequent request including a private port number associated with the selected gateway; and
  translating at the load balancer the private port number associated with the selected gateway to a defined port number of the selected gateway.

2. The method of claim 1, further comprising:
  forwarding the subsequent request from the load balancer to the selected gateway, the subsequent request including the defined port number of the selected gateway.

3. The method of claim 2, further comprising:
  receiving at the load balancer a response to the subsequent request from the selected gateway, the response including the defined port number of the selected gateway;
  translating at the load balancer the defined port number of the selected gateway to the private port number associated with the selected gateway.

4. The method of claim 3, further comprising:
  forwarding the response to the client terminal from the load balancer, the response including the private port number associated with the selected gateway.

5. The method of claim 1, further comprising:
  maintaining an association between the client terminal and the selected gateway at the load balancer.

6. The method of claim 1, wherein the information identifying the selected gateway includes an Internet Protocol address of the selected gateway.

7. A method for re-directing a client session, comprising:
  receiving a request from a client terminal at a load balancer;
  selecting one of a plurality of gateways being managed by the load balancer to process the request;
  sending a re-direct message to the client terminal from the load balancer, the re-direct message including information identifying the selected gateway; and
  receiving at the load balancer from the client terminal a subsequent request associated with the re-direct message, the subsequent request including the Internet Protocol address of the selected gateway.

8. The method of claim 7, further comprising:
forwarding the subsequent request to the selected gateway from the load balancer, the subsequent request including the Internet Protocol address of the selected gateway.

9. The method of claim 8, further comprising:
receiving at the load balancer a response to the subsequent request from the selected gateway, the response including the Internet Protocol address of the selected gateway;
forwarding the response to the client terminal from the load balancer.

10. The method of claim 7, further comprising:
maintaining an association between the client terminal and the selected gateway at the load balancer.

11. An apparatus for re-directing a client session, comprising:
a load balancer operable to receive an initial request from a client terminal, the load balancer operable to select one of a plurality of gateways managed by the load balancer to process the request, the load balancer operable to send a re-direct message to the client terminal in response to the request, the re-direct message including information identifying the selected gateway;
wherein the load balancer receives a subsequent request from the client terminal, the subsequent request including the information identifying the selected gateway, the load balancer operable to forward the request to the selected gateway.

12. The apparatus of claim 11, wherein the load balancer maintains an association between the client terminal and the selected gateway.

13. The apparatus of claim 11, wherein the information identifying the selected gateway includes one of a private port number associated with the selected gateway and an Internet Protocol address of the selected gateway.

14. A method for re-directing a client session, comprising:
receiving a request from a client terminal at a load balancer;
selecting one of a plurality of gateways being managed by the load balancer to process the request;
sending a re-direct message to the client terminal from the load balancer, the re-direct message including information identifying the selected gateway;
receiving at the load balancer from the client terminal a subsequent request associated with the re-direct message, the subsequent request including information identifying the selected gateway; and
forwarding the subsequent request to the selected gateway from the load balancer.

15. The method of claim 14, wherein the subsequent request includes an Internet Protocol address of the selected gateway.

16. The method of claim 14, wherein the subsequent request includes a private port number of the selected gateway.

17. An apparatus for re-directing a client session, comprising:
means for receiving at a load balancer a request from a client terminal;
means for selecting one of a plurality of gateways being managed to process the request;
means for sending a re-direct message to the client terminal, the re-direct message including information identifying the selected gateway;
means for receiving at the load balancer from the client terminal a subsequent request associated with the re-direct message, the subsequent request including the information identifying the selected gateway; and
means for forwarding the subsequent request to the selected gateway from the load balancer.

18. The apparatus of claim 17, wherein the information identifying the selected gateway may be a private port number associated with the selected gateway.

19. The apparatus of claim 17, wherein the information identifying the selected gateway is an Internet Protocol address of the selected gateway.

20. The apparatus of claim 17, further comprising:
means for maintaining an association between the client terminal and the selected gateway.

* * * * *